Sept. 13, 1966   H. R. LYTTON   3,272,104
CAMERA WITH LIGHT MEASURING DEVICE
Filed Feb. 9, 1965
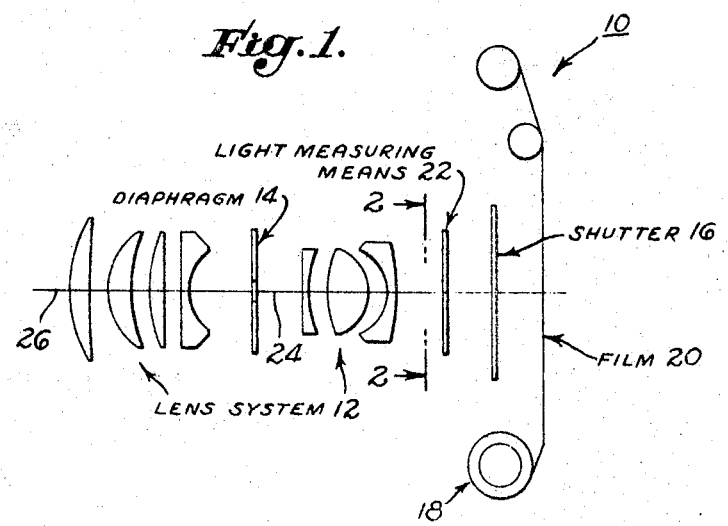
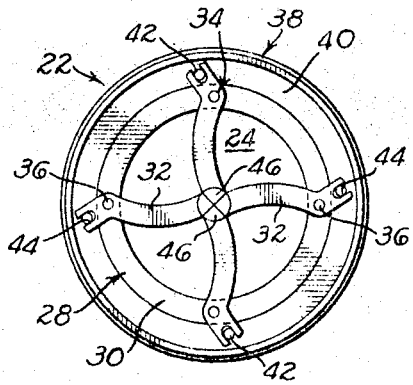   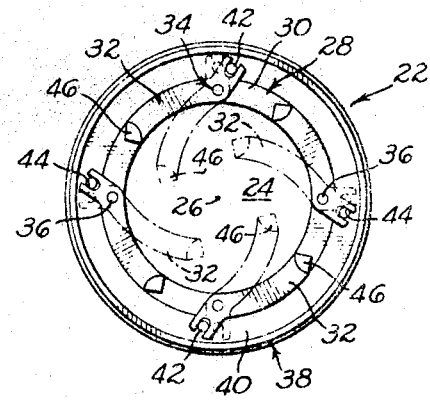
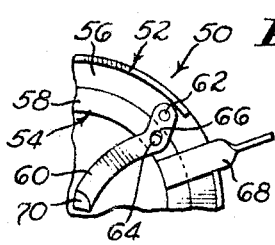
INVENTOR.
HAROLD R. LYTTON
BY HIS ATTORNEYS.
HARRIS, KIECH, RUSSELL & KERN

United States Patent Office 3,272,104
Patented Sept. 13, 1966

3,272,104
CAMERA WITH LIGHT MEASURING DEVICE
Harold R. Lytton, 11540 Blix, North Hollywood, Calif.
Filed Feb. 9, 1965, Ser. No. 431,259
3 Claims. (Cl. 95—10)

The present invention relates in general to light sensing and measuring devices and, more particularly, to means for directly sensing and measuring the light received by a camera, and particularly a film-type photographic camera. For convenience in disclosing the invention, the invention will be considered in connection with such a camera herein, although it may be used for other purposes and in other environments without departing from the spirit thereof.

The primary object of the invention is to provide a light sensing and measuring means which will measure directly the intensity of the light traversing the light path of any type of camera. More particularly, the primary object of the invention is to locate the light sensing and measuring means on the path of the light received by the camera.

Still more particularly, an important object of the invention is to locate the light sensing and measuring means at any suitable point on the light path of the camera ahead of the shutter, either on the central or optical axis of the camera, or, in cameras of the reflex type in some instances, on the reflected portion of the light path. When the light measuring device of the invention is on the optical axis, it may be behind or ahead of any diaphragm used, and it may be behind or ahead of the lens means, or between elements of the lens means, as long as it is ahead of the shutter.

Another important object of the invention is to provide a light sensing and measuring device which includes: supporting means located externally of the light path; a plurality of arms, i.e., at least two arms, having inner and outer ends and having their outer ends mounted on the supporting means for swinging movement of the arms in a plane perpendicular to the light path between inoperative positions wherein the arms are located externally of the light path and operative positions wherein the inner ends of the arms are within the light path; actuating means for swinging the arms between such inoperative and operative positions; and photosensitive elements on the arms, respectively, in locations to be within the light path when the arms are in their operative positions.

With the foregoing construction, the arms carrying the photosensitive elements are completely removed ture, but are inserted into the light path when it is desired to measure directly the intensity of the light traversing such path. Thus, a direct light measurement is achieved without interference with the light traversing the light path during the actual taking of a picture, which is an important feature.

A further object of the invention is to make the arms carrying the photosensitive elements transparent so that, in the case of a camera of the reflex type, the scene to be photographed can be viewed through the transparent arms if they are located in the laterally reflected portion of the light path. Also, when the arms are located in the reflected portion of the light path in a reflex camera, they do not need to be retracted when taking a picture.

Another and important object of the invention is to provide a light sensing and measuring device wherein the mounting means for the arms carrying the photosensitive elements provides for swinging movement of the arms from inoperative positions externally of the light path through first operative positions wherein the inner ends of the arms are spaced apart within the light path to second operative positions wherein the inner ends of the arms are at least substantially in abutting relation in the center of the light path, and wherein the photosensitive elements are carried by the inner ends of the arms and respectively comprise parts of a geometric figure which are in juxtaposition to form the geometric figure when the arms are in their second operative positions.

With the foregoing construction, when the arms are in their intermediate, operative positions, the photosensitive elements are spaced apart to measure average light intensity. On the other hand, when the arms are in their innermost operative positions, the photosensitive elements form a geometric figure, such as a circle, on the center of the light path so that the device may be utilized for measuring light intensity at a particular spot on the scene to be photographed, instead of measuring over-all light intensity. Thus, the device of the invention may be utilized as either an over-all light or exposure meter, or as a spot meter, which is an important feature.

It is contemplated that the light measuring means of the invention may be used to provide the user of the camera with a light intensity reading, leaving it to the user to make the necessary corresponding diaphragm opening and/or shutter speed settings. It is further contemplated that the camera may be made semiautomatic or fully automatic as to exposure by utilizing the signal from the light measuring means to control the shutter speed, or the aperture setting, or both.

The foregoing objects, advantages, features and results of the present invention, together with various other objects, advantages, features and results thereof which will be evident to those skilled in the camera and/or light measuring art in view of this disclosure, may be achieved with the exemplary embodiments of the invention hereinbefore and hereinafter described and illustrated in the accompanying drawing, in which:

FIG. 1 is a diagrammatic view of a typical nonreflex camera embodying the light sensing and measuring means of the invention;

FIG. 2 is an enlarged elevational view of the light sensing and measuring means of the invention, taken as indicated by the arrowed line 2—2 of FIG. 1 and showing photosensitive elements of the device in second, innermost operative positions to obtain a spot light intensity measurement;

FIG. 3 is a view similar to FIG. 2, except that it shows the photosensitive elements in inoperative positions in solid lines, and shows them in first, intermediate operative positions in broken lines, the broken line positions of the photosensitive elements providing an average or over-all light intensity measurement; and FIG. 4 is a fragmentary view similar to FIG. 2, but showing an alternative embodiment.

In the drawing, the light sensing and measuring means of the invention is shown as being incorporated in a non-reflex camera and as being on the optical axis of the camera. It will be understood that in the case of a camera of the reflex type, the light sensing and measuring means may be located off the optical axis of the camera and in the portion of the light path which is reflected laterally for viewing.

Turning now to FIG. 1 of the drawings, illustrated diagrammatically therein is a typical camera 10 which includes a multiple-element lens means or system 12, a variable-aperture diaphragm 14 within the lens system, a shutter 16, and a film holder or holding means 18 for roll-type film 20. It will be understood that the particular camera 10 shown is illustrative only and that the invention may be embodied in or utilized in connection with any desired type of camera having components of any desired types.

The light sensing and measuring means or device of the invention is designated generally by the numeral 22 and is located on the path 24 of the light received by and passing through the camera 10. In the particular construction illustrated, the light measuring device 22 is located on the central, optical axis 26 of the camera 10. However, it will be understood that locating the light measuring device 22 on the optical axis 26 is not necessary, it merely being necessary that such device be located somewhere on the path of the light received by the objective lens or lens system of the camera. For example, in the case of a reflex camera, it may be located on the portion of the light path which is reflected laterally for viewing. Also, in cameras where the shutter is normally closed to prevent undesired exposure of film within the camera, the light measuring device 22 must be located ahead of the shutter. However, in a camera of the direct viewing type, even this restriction is not necessary.

Furthermore, although the light measuring device 22 of the invention has been shown as located behind the lens means 12 and the diaphragm 14, it may be located ahead of the diaphragm, and may be located ahead of the lens means 12, or within the lens means in the case of a multiple-element lens means. Additionally, the light measuring device 22 may be built into the camera, or it may take the form of an attachment. For example, the light measuring device 22 may take the form of an attachment mountable on the camera 10 ahead of the lens means 12, or as an accessory to a lens means in cameras having interchangeable lens means.

Considering the light sensing and measuring device 22 in more detail now, and referring particularly to FIGS. 2 and 3 of the drawing, it includes a supporting means 28 shown as having the form of a ring 30 encircling the light path 24 and suitably mounted on the structure of the camera 10. The light measuring device 22 also includes a plurality of arms 32 so arranged and mounted on the supporting ring 30 that they may be swung in a plane perpendicular to the light path 24 in much the same manner as the leaves of a conventional iris-type variable-aperture diaphragm.

More particularly, the light measuring device 22 includes means 34 mounting the outer ends of the arms 32 on the supporting ring 30 for swinging movement of the arms in a plane perpendicular to the light path 24 from inoperative positions wherein the arms are located externally of the light path, as shown in solid lines in FIG. 3, through first operative positions wherein the inner ends of the arms are spaced apart within the light path, as shown in broken lines in FIG. 3, to second operative positions wherein the inner ends of the arms are at least substantially in abutment in the center of the light path, as shown in FIG. 2 of the drawing. In the particular construction illustrated in FIGS. 2 and 3, the mounting means 34 includes pivots 36 pivotally connecting the outer ends of the arms 32 to the supporting ring 30.

The light measuring device 22 also includes actuating means 38 for swinging the arms 32 from their inoperative positions through their first operating positions to their second operating positions, and back again. In the embodiment under consideration, the actuating means 38 is shown as comprising an actuating ring 40 encircling and rotatably mounted on the supporting ring 30. The actuating ring 40 carries actuating pins 42 which are disposed in notches 44 in the outer ends of the arms 32. As will be apparent, by rotating the actuating ring 40 relative to the mounting or supporting ring 30, the arms 32 are swung through the range of positions indicated in a plane perpendicular to the light path 24.

The light sensing and measuring device 22 also includes light sensitive or photosensitive elements 46 carried by the respective arms 32 in locations to be within the light path 24 when the arms are in their first and second operative positions. More particularly, the photosensitive elements 46 are mounted on the inner ends of the arms so that the photosensitive elements are uniformly spaced apart throughout the light path 24 when the arms are in their first operative positions, as shown in broken lines in FIG. 3, and are located in the center of the light path when the arms are in their second operative or innermost positions, as shown in FIG. 2. Preferably, the photosensitive elements 46 respectively comprise parts of a geometric figure, such as a circle, which are in juxtaposition to form the geometric figure when the arms 32 are in their innermost positions.

When the arm 32 are in their innermost or second operative positions, the photosensitive elements 46 in effect constitute a single photosensitive element at the center of the light path. Under such conditions, the light sensing and measuring device 22 may be used as a spot exposure meter for measuring the light intensity in a particular small area of a scene to be photographed. This feature is particularly valuable in portrait photography, for example, although not restricted thereto.

When the arms 32 are in their intermediate or first operative positions, as shown in broken lines in FIG. 3, the photosensitive elements 46 are uniformly spaced apart in a plane extending transversely of the light path 24 so that they provide an average or over-all measurement of light intensity. It will be understood that the number of arms 32 and photosensitive elements 46 shown may be increased or decreased as desired. Increasing the number will improve the accuracy of the average or over-all measurement of light intensity achieved when the arms 32 are in their intermediate or first operative positions.

It will be understood that, with the particular camera 10 shown, the arms 32 are swung outwardly into their inoperative positions externally of the light path after obtaining a measurement of light intensity for a particular scene, but before photographing such scene. Thus, the arms 32 and the photosensitive elements 46 carried thereby do not interfere with the passage of light to the shutter 16, and to the film 20 upon opening of the shutter. In the case of a camera of the reflex type where the light measuring device 22 is located in the portion of the light path that is reflected laterally for viewing, the arms 32 may be made of transparent material so that they do not interfere with viewing of the scene. In this instance, the arms 32 need not be completely retractable out of the reflected portion of the light path since they are not in the portion of the light path extending to the film upon photographing a scene.

The photosensitive elements 46 are electrically connected in any suitable manner, not shown, to any appropriate means, not shown, responsive to the signals produced thereby. For example, the photosensitive elements 46 may be connected to a meter for merely indicating the light intensity. In such a case, the user of the camera must make the necessary aperture and/or shutter-speed settings corresponding to the light intensity reading.

In addition to utilizing the light measuring device 22 for manual camera operation in the foregoing manner, the light measuring device may be utilized in a manner to render the camera semiautomatic or fully automatic as to exposure. For example, the light measuring device 22 may be utilized to render the camera semiautomatic by employing the signals from the photosensitive elements 46 to directly control shutter speed. Alternatively, the camera may be rendered fully automatic as to exposure by utilizing the signals from the photosensitive elements 46 to automatically set both the aperture and the shutter speed properly. Various ways of doing this are known to the art so that a further description herein is not required.

FIG. 4 of the drawing shows, fragmentarily, an alternative light sensing and measuring device 50 incorporating alternative supporting and actuating means 52 and 54. In this case, the supporting means 52 includes an outer supporting or mounting ring 56 which is stationary, and an inner actuating ring 58 which is rotatable. The device 50 includes arms 60 which correspond to the arms 32, but which are mounted on the outer supporting ring 56 by pivots 62. The inner actuating ring 58 carries actuating pins 64 disposed in slots 66 in the arms 60. The actuating ring 58 is adapted to be rotated by an actuating lever 68 to swing the arms 60 in a plane perpendicular to the light path in the same manner as the actuating ring 40 swings the arms 32. The arms 60 are provided at their inner ends with photosensitive elements 70 corresponding to the photosensitive elements 46. In all other respects, the operation of the light measuring device 50 is the same as that of the light measuring device 22 so that a further description is not necessary.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:
1. In combination with a camera receiving light along a predetermined light path, a light measuring device including:
   (a) supporting means located externally of the light path;
   (b) a plurality of arms having inner and outer ends;
   (c) photosensitive elements respectively carried by the inner ends of said arms;
   (d) means mounting said outer ends of said arms on said supporting means for swinging movement of said arms in a plane perpendicular to the light path from inoperative positions wherein said arms and said photosensitive elements are located externally of the light path, through a series of first operative positions wherein said photosensitive elements are uniformly spaced apart within said light path, to second operative positions wherein said photosensitive elements are in juxtaposition at the center of said light path;
   (e) actuating means for swing said arms between said inoperative positions and said second operative positions through said first operative positions; and
   (f) said photosensitive elements being electrically interconnected to provide a composite measurement of the light incident thereon.

2. A light measuring device including:
   (a) supporting means located externally of a light path;
   (b) a plurality of arms having inner and outer ends;
   (c) photosensitive elements respectively carried by the inner ends of said arms;
   (d) means mounting said outer ends of said arms on said supporting means for swinging movement of said arms in a plane perpendicular to the light path from inoperative positions wherein said arms and said photosensitive elements are located externally of the light path, through first operative positions wherein said photosensitive elements are uniformly spaced apart within said light path, to second operative positions wherein said photosensitive elements are in juxtaposition at the center of said light path;
   (e) actuating means for swinging said arms between said inoperative positions and said second operative positions through said first operative positions; and
   (f) said photosensitive elements being electrically interconnected to provide a composite measurement of the light incident thereon.

3. A light measuring device including:
   (a) supporting means located externally of a light path;
   (b) a plurality of arms having inner and outer ends;
   (c) photosensitive elements respectively carried by the inner ends of said arms;
   (d) means mounting said outer ends of said arms on said supporting means for swinging movement of said arms in a plane perpendicular to the light path between first operative positions wherein said photosensitive elements are uniformly spaced apart within said light path and second operative positions wherein said photosensitive elements are in juxtaposition at the center of said light path;
   (e) actuating means for swinging said arms between said first and second operative positions; and
   (f) said photosensitive elements being electrically interconnected to provide a composite measurement of the light incident thereon.

References Cited by the Examiner

UNITED STATES PATENTS

| 2,194,031 | 3/1940 | Riszdorfer | 95—10 |
| 2,937,582 | 5/1960 | Goshima | 95—10 |
| 3,107,594 | 10/1963 | Falkenburg | 95—10 X |
| 3,192,841 | 7/1965 | Reymond | 95—64 |

FOREIGN PATENTS

| 746,837 | 3/1956 | Great Britain. |
| 258,022 | 4/1949 | Switzerland. |
| 274,267 | 6/1951 | Switzerland. |

NORTON ANSHER, *Primary Examiner.*

J. F. PETERS, *Assistant Examiner.*

UNITED STATES PATENT OFFICE
CERTIFICATE OF CORRECTION

Patent No. 3,272,104                      September 13, 1966

Harold R. Lytton

It is hereby certified that error appears in the above numbered patent requiring correction and that the said Letters Patent should read as corrected below.

Column 1, line 50, after "removed" insert -- from the light path during the actual taking of each pic- --; column 4, line 11, for "arm" read -- arms --.

Signed and sealed this 1st day of August 1967.

(SEAL)
Attest:

Edward M. Fletcher, Jr.                      EDWARD J. BRENNER
Attesting Officer                           Commissioner of Patents